UNITED STATES PATENT OFFICE.

JOHN H. OWINGS, OF DEER LODGE CITY, MONTANA TERRITORY.

BITTERS.

SPECIFICATION forming part of Letters Patent No. 350,988, dated October 19, 1886.

Application filed June 8, 1886. Serial No. 204,502. (No specimens.)

*To all whom it may concern:*

Be it known that I, JOHN H. OWINGS, a citizen of the United States, residing at Deer Lodge City, in the county of Deer Lodge and Territory of Montana, have invented certain new and useful Improvements in Bitters; and I do hereby declare the following to be a full, clear, and exact description of the invention, such as will enable others skilled in the art to which it appertains to make and use the same.

My invention relates to bitters, and has for its object to make a bitters invigorating to the digestive organs, purifying to the blood, and improving to the appetite; and it consists of the compound hereinafter particularly described and claimed.

To prepare the bitters, the following is the formula: dried orange-peel, ground, two pounds; gentian-root, ground, two pounds; Oregon grape-root, ground, one-half pound; Virginia snake-root, ground, one pound; blue flag, (calamus,) ground, one-half pound; coriander-seed, ground, one-half pound; cardamon-seeds, ground, one-half pound; cinnamon-bark, ground, one-half pound; dilute alcohol, four gallons. The above is macerated for fourteen days, then expressed and filtered, and afterward there is added to it simple sirup, four gallons; alcohol, fourteen gallons, and water in sufficient quantity to make forty-eight gallons. The whole is thoroughly mixed and then bottled.

The dose is one table-spoonful to a wine-glassful before meals.

The proportions given above are considered the best for producing the bitters; but the proportions may be varied without departing from the invention.

Having described my invention and set forth its merits, what I claim is—

The within-described bitters, having as ingredients dried orange-peel, gentian-root, Virginia snake-root, Oregon grape-root, blue flag, (calamus,) coriander-seed, cardamon-seed, cinnamon-bark, alcohol, and simple sirup, in about the proportion specified, for the purposes set forth.

In testimony whereof I affix my signature in presence of two witnesses.

JOHN H. OWINGS.

Witnesses:
 A. P. WINSLOW,
 CHAS. S. WILLIAMS.